United States Patent [19]

Brehse

[11] 4,287,557
[45] Sep. 1, 1981

[54] INVERTER WITH IMPROVED REGULATION

[75] Inventor: Robert F. Brehse, Fort Wayne, Ind.

[73] Assignee: General Electric Company, Salem, Va.

[21] Appl. No.: 104,572

[22] Filed: Dec. 17, 1979

[51] Int. Cl.³ .................... H02P 13/20; G05F 1/40
[52] U.S. Cl. ................................. 363/95; 323/280
[58] Field of Search ............... 323/4, 20; 363/78–79, 363/95, 97–98; 361/235; 355/3 CH, 14 CH

[56] References Cited

U.S. PATENT DOCUMENTS

| 3,636,298 | 1/1972 | Risberg et al. | 323/20 X |
| 3,772,585 | 11/1973 | Johnson | 361/235 |
| 3,896,287 | 7/1975 | Cook | 363/79 |
| 4,038,593 | 7/1977 | Quinn | 323/20 X |
| 4,042,874 | 8/1977 | Quinn et al. | 323/20 X |

Primary Examiner—William M. Shoop
Assistant Examiner—Peter S. Wong
Attorney, Agent, or Firm—James H. Beusse

[57] ABSTRACT

A feedback loop is provided within an inverter feedback control system for modifying reference voltage to effect modifying output voltage from the inverter circuit thereby to maintain constant average rectified resistive current to a complex load, compensating for variations in load current which result from a changing characteristic of the complex load.

9 Claims, 4 Drawing Figures

INVERTER WITH IMPROVED REGULATION

BACKGROUND OF THE INVENTION

1. Field of the Invention

The present invention relates to an electrical circuit for supplying high-voltage AC electrical energy to and for regulating resistive current through a complex load; and, more particularly, to such a circuit including a voltage controlled inverter and having means for compensating for variations in load current resulting when a changing characteristic of the complex load causes variations in the ratio of peak to average rectified resistive current to the complex load.

2. Description of the Prior Art

The present invention was conceived as an improvement upon the electrical circuit having means for regulating resistive current through a complex load set forth in the copending application of William R. Archer, Ser. No. 042,765, filed May 29, 1979, and assigned to General Electric Company, the assignee of the present invention.

A high-voltage AC power supply such as that described and claimed in the Archer application is capable, with modification, of providing an output voltage waveform of the type shown in FIGS. 2 and 4. Such a high-voltage AC power supply may be used to supply a non-linear complex load, such as for example, a corotron of the type used in reprographic equipment and having the characteristic shown in FIG. 3. One requirement of such a power supply is that the average rectified resistive current be regulated and held constant as the load characteristic of the corotron changes from condition "a" to condition "b" as seen in FIG. 3. The Archer application describes a regulation scheme which senses the output current during the flat top period of the output waveform, and then controls the output voltage so as to maintain a constant peak to peak resistive component of output current.

It was discovered, however, that simply regulating the peak to peak value of output current does not result in a regulated rectified resistive average current because the peak current value duty cycle of the resistive current changes when the corotron load characteristic changes from condition "a" to condition "b." In other words, the ratio of peak to average rectified resistive load current does not remain constant when the load characteristic of a complex load changes.

This duty cycle or waveform change in the resistive load current is also shown in FIG. 4. It can be seen that, if the peak value of resistive load current is maintained constant (regulated), then the average rectified value thereof, the area under the current waveform curve, will be a smaller value at the higher output voltage condition "b." In order to correct for such a condition, a higher peak current is needed in condition "b."

It was also recognized that the effects of a voltage divider used in a feedback circuit to conrol the inverter also has a bearing on regulating the output current. Such a voltage divider is placed in parallel with the complex load across the output of the voltage controlled inverter. A sense resistor used in the current regulation scheme senses both the divider current and output load current. If the current as sensed by the sense resistor is regulated to maintain a constant value, then, at the higher output voltage condition, a greater amount of current will be flowing in the divider and less in the load. To compensate for this condition, it would also be necessary to provide more output current, that is more peak current, in load condition "b" of FIG. 4, the higher output voltage condition.

It is desirable to provide a high-voltage AC power supply for driving a complex load which is capable of compensating for both the above-mentioned effects thereby to result in a power supply with improved regulation characteristics.

It is, therefore, an object of the present invention to provide a high-voltage AC power supply which is capable of providing a regulated rectified average resistive current to compensate for changes in the characteristic of the complex load and at the same time to compensate for the effects of this voltage divider placed in parallel with the complex load across the output of the power supply.

SUMMARY OF THE INVENTION

In carrying out the object of my invention, in one form, there is provided an electrical circuit for supplying high-voltage AC electrical energy to and for regulating resistive current through a complex load. Such a complex load includes variable resistive and variable shunt capacitive components. The circuit includes a voltage-controlled inverter having a pair of output terminals, the inverter producing an output voltage waveform at least a portion of each half cycle of which has a $dv/dt$ approximately equal to zero. Also included are means for sensing output current. A reference voltage source is included, as are means for comparing the sensed current with the reference voltage and for producing an amplified error voltage. Means are provided for sampling the amplified error voltage when $dv/dt$ of the output voltage is approximately equal to zero. Means are included for obtaining a long-term average of a plurality of samples of the amplified error voltage and means are provided for applying the long-term average to the inverter to control the amplitude of the high-voltage AC waveform supplied to the complex load. And finally, means are included for compensating for variations in load current resulting when a changing characteristic of the complex load causes variations in the ratio of peak to average rectified resistive current through the complex load so as to provide a substantially constant average rectified resistive output current.

DESCRIPTION OF THE PREFERRED EMBODIMENT

Figure 1:
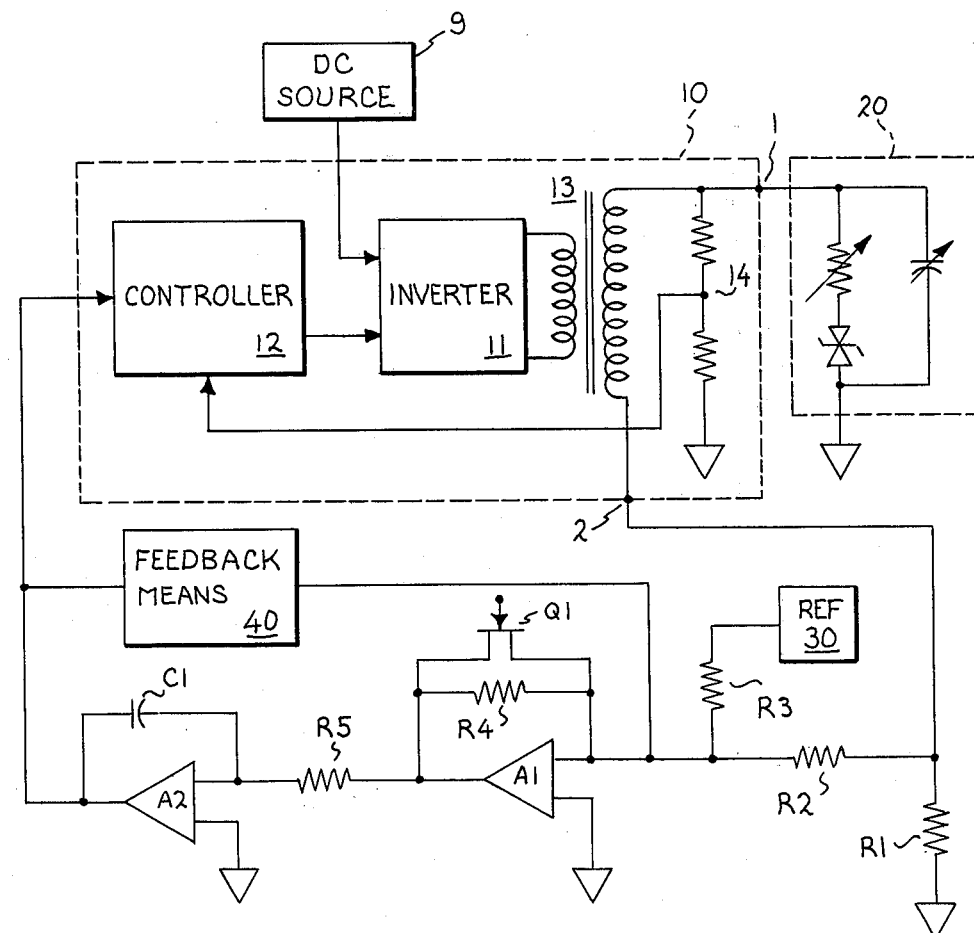
FIG. 1 shows by schematic representation, partly in block form, the preferred embodiment of the electrical circuit of the present invention.

In accordance with the present invention and referring now to FIG. 1, there is shown the preferred embodiment of an electrical circuit for supplying high-voltage AC electrical energy to and for regulating resistive current through a complex load. A DC source 9 provides DC electrical energy. A voltage-controlled inverter 10 is provided having a pair of output terminals 1 and 2 for generating a high-voltage AC waveform (from DC) having a dv/dt approximately equal to zero during at least a portion of each half cycle to be supplied to complex load 20. Complex load 20 is non-linear and includes variable resistive and variable shunt capacitive components and is intended to represent a corotron, a corona generating device typically used in reprographic equipment. Voltage controlled inverter 10 includes an inverter subcircuit 11, a controller 12, and a leakage reactance transformer 13 for transforming the AC electrical energy from the inverter to high-voltage AC electrical energy at the output terminals 1 and 2. A voltage divider 14 is provided for providing feedback to controller 12. Such voltage feedback is necessary to obtain the required output voltage waveform fidelity as will be recognized by those skilled in the art.

Means are provided for sensing current flowing through the complex load 20, this in the form of a resistor R1 connected serially between the output winding of transformer 13 and circuit common. Means are also provided for supplying a reference voltage, this in the form of reference voltage source 30. Means are provided for comparing the sensed current with the reference voltage and for producing an amplified error voltage, this including comparison amplifier A1. Amplifier A1 compares the magnitude of the reference voltage from the reference source 30 with the magnitude of the voltage developed across the sensing resistor R1 to produce an amplified error signal, a voltage, at the output of A1. These two inputs to A1 are monitored by resistors R2 and R3.

Figure 2:
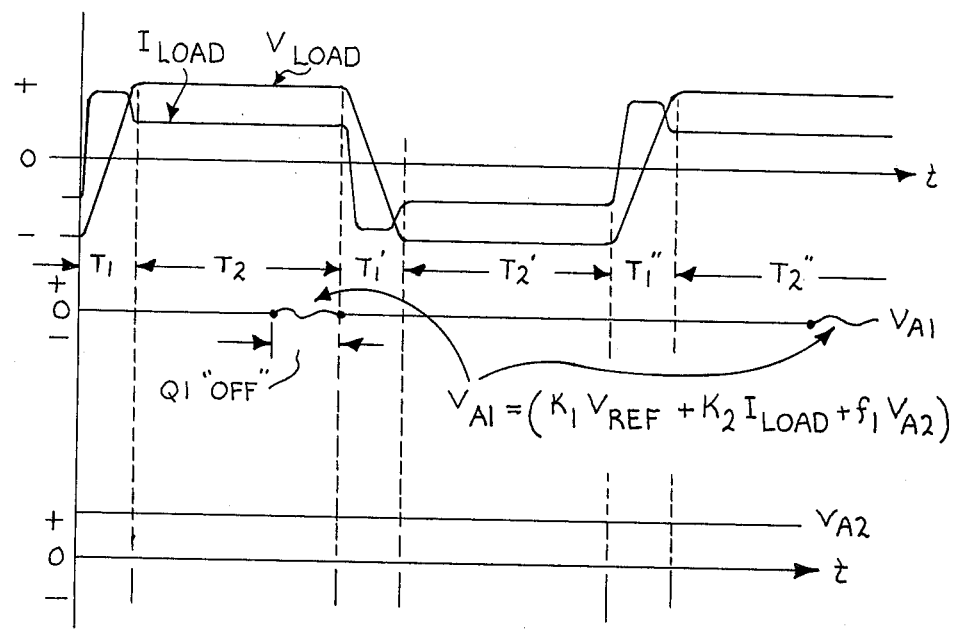
FIG. 2 shows by graphic representation various waveforms taken from this preferred embodiment circuit.

Means are provided for sampling the amplified error voltage at the output of amplifier A1, this including gate controlled FET Q1 connected across the summing junction input and the output terminal of A1. FET Q1 acts as a bilateral or "on/off" switch and is controlled so that we may ignore all parts of the outut voltage waveform during which capacitive current flows: that is, during those times T1, T1', T1'', etc., shown in FIG. 2. The output voltage $V_{A1}$ of amplifier A1 therefore is fixed to be zero except during that portion of the cycle in which only resistive current is flowing: i.e., as shown in FIG. 2, the times T2, T2', T2'', etc. By design choice, however, such will only occur during a portion of the positive portion of the cycle: that is, during T2, T2'', etc. Such is accomplished by applying an appropriate control signal to FET Q1 so that it is turned "on" for all times except when the sample is desired. During the sample, FET Q1 is turned "off." This can be seen graphically in FIG. 2 where the voltage $V_{A1}$, the output of amplifier A1, is shown.

FIG. 2 shows graphically voltage and current waveforms as typically provided to a corotron. As hereinbefore stated, during the times T1, T1', T1'', etc., the current waveform reflects capacitive current, and during the times T2, T2', T2'', etc., the current waveform reflects resistive current through the complex load 20. It is the purpose of this circuit to measure and regulate only that portion of the load current which is resistive.

The output error voltage $V_{A1}$ of amplifier A1 is therefore equal to the amplified difference between the reference voltage from source 30 and a voltage proportional to the resistive portion of the load current during the sample interval and is essentially zero volts for any and all other segments of the cycle.

Means are also provided for obtaining a long-term average of many such samples of the amplified error voltage. Such is accomplished by fitting the output voltage $V_{A1}$ of amplifier A1 into a long-term integrator A2. Integrator A2 functions to average the output samples of amplifier A1 over many such samples, thereby to produce a relatively smooth steady-state output as shown in FIG. 2. Means are also provided for applying the long-term average to the inverter to control the amplitude of the high-voltage AC waveform supplied to complex load 20; to effect this, the output voltage $V_{A2}$ of the integrator A2 is applied to the control terminal of the controller 12 of the voltage controlled inverter 10.

The operation of the circuit as thus far described is essentially as follows. If the resistive portion of load current tends to increase for any reason, $V_{A1}$, the output voltage of amplifier A1, will tend to increase. This occurs because a voltage proportional to the current through R1 is compared with the fixed reference voltage from voltage source 30, and of course, due to the sampling, only the resistive portion (during the positive half-cycle) is sensed. Because $V_{A1}$ increases, i.e., is more positive in polarity, the output voltage $V_{A2}$ of integrator A2 also increases, but in a negative sense; that is, output voltage $V_{A2}$ decreases slightly. This causes the inverter controller 12 to reduce the output voltage of the inverter 11 thus reducing resistive load current. In conventional feedback loop control, the circuit thus maintains and regulates load current, and in particular, resistive load current.

Figure 3:
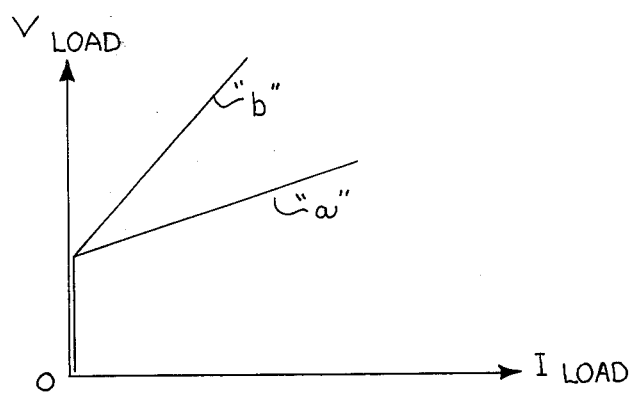
FIG. 3 shows graphically load characteristic of a corotron.

When the load characteristic as seen in FIG. 3 changes from condition "b" to condition "a," and assuming that output voltage remains essentially unchanged, an increase in output current results. This higher value of output current results in a higher magnitude of negative voltage at the junction of resistors R1 and R2 than in the steady-state condition. This more negative voltage at this junction is amplified by amplifier A1, during the sampling period (when Q1 is off), and appears at the output of A1 as a positive error voltage. This positive error voltage is fed to integrator A2, causing the output $V_{A2}$ to slew in a negative direction (a positive value decreasing in magnitude). This voltage, $V_{A2}$, fed to controller 12 causes a decrease in the output voltage of the inverter 11, and hence, a decrease in current through the load and through sense resistor R1. This circuit action continues until the voltage across resistor R1, during the sample period (Q1 off), is returned to the steady-state value. Of course, when output current falls, the circuit compensates accordingly, but in the opposite direction.

Figure 4:
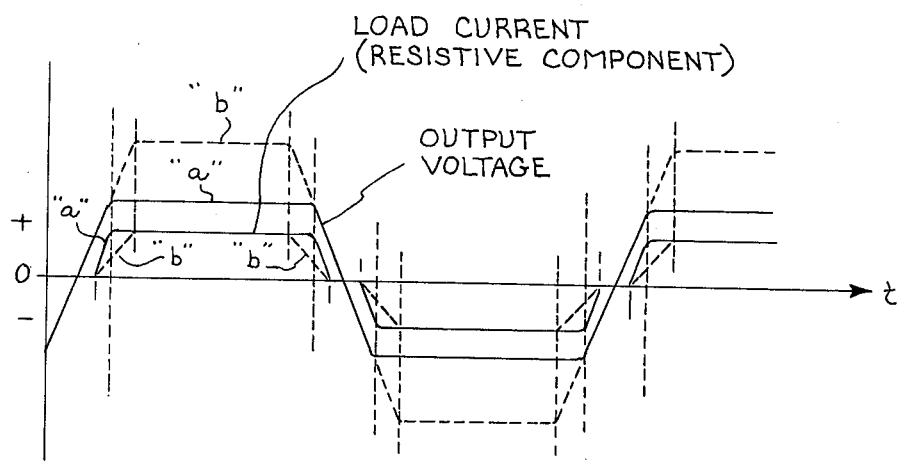
FIG. 4 shows graphically the voltage waveform and the resistive current waveforms supplied by the preferred embodiment circuit into the corotron having the characteristic of FIG. 3.

Merely controlling the peak to peak value of resistive output current, however, does not result in rectified average resistive current remaining constant because the duty cycle of the resistive current changes when the load characteristic of a complex load, and in particular, a nonlinear one, such as a corotron, changes as from condition "a" to condition "b" as seen in FIG. 3. In essence, then, the ratio of peak to average resistive rectified load current does not remain constant when the load characteristic of a complex load changes. Referring to FIG. 4, it can be see that if the peak value of resistive load current is maintained constant (i.e., regulated), then the average rectified value, the area under the current waveform curve, will be a smaller value at the higher output voltage condition "b" than at the condition "a." To correct for this effect, a higher peak current is needed in condition "b." Conversely, when we move from condition "b" to condition "a," the peak value of resistive load current has been maintained constant, but a slightly higher average rectified value of resistive current results due to an increase in the area under the current versus time waveform. To correct, a lower peak current is needed.

Furthermore, voltage divider 14 has an adverse effect upon current regulation. Sense resistor R1 senses both the voltage divider current and load current. If current in the sense resistor is regulated to maintain a constant value, then at the higher output voltage condition "b," a greater amount of current will be flowing in the divider and less in the load. To compensate for this, it is necessary to provide more output current in load condition "b" of FIG. 4, the higher output voltage condition.

In order to compensate for both the above regulation effects, I have provided means for compensating for variations in load current resulting when changing characteristics of the complex load cause variations in the ratio of peak to average rectified resistive current through the complex load. This takes the form of feedback means 40 as shown in FIG. 1 and in the preferred embodiment, a feedback resistor. This feedback resistor is connected between the output of integrator A2 and the input to the summing junction of amplifier A1.

Operation of the circuit is as follows. Current through the sensing resistor R1 is sampled during the flat top portion of the positive half cycle of the output voltage waveform shown as T2, T2", etc., in FIG. 2. The signal is held and compared to the reference voltage from source 30 and the amplified error is integrated. The output of the integrator A2 controls directly the amplitude of the output voltage waveform of the voltage controlled inverter 10. A feedback signal from feedback means 40 originating at the output of the integrator A2 is fed to the summing junction of amplifier A1 with a positive feedback sense. This feedback signal is a function of the output of the integrator A2 and is proportional to the peak amplitude of the output voltage. When the load characteristic as shown in FIG. 3 changes from condition "b" to condition "a," the output of integrator A2 decreases. When the output of integrator A2 decreases, the value of the feedback signal from feedback means 40 to amplifier A1 decreases. This causes the input of integrator A2 to change further in a negative direction ($V_{A2}$ becomes less positive) hence lowering the output of the inverter further until a new equilibrium, steady-state, is reached. When a higher output AC voltage waveform is required, a feedback signal is fed back to the summing junction of amplifier A1 effectively increasing the reference voltage and thus causing the inverter output voltage to go to a higher value, thereby compensating for the regulation effects of both the divider resistor and the change in current waveform.

Voltage controlled inverter 10 may be of any type capable of producing a waveform, at least a portion of each half cycle of which has a dv/dt approximately equal to zero. While there is shown in FIGS. 2 and 4 a trapezoidal output voltage waveform (having linear rise and fall times) from voltage controlled inverter 10, the present invention will operate equally as well when the output voltage waveform has exponential rise and fall times, so long as a portion of each half cycle of the waveform has a dv/dt approximately equal to zero.

The electrical circuit of FIG. 1 has been built and has operated satisfactorily with components having the following values or designations.

| Component | | Value/Designation |
|---|---|---|
| Resistor | R1 | 1K Ohm |
| | R2 | 100K Ohm |
| | R3 | 787K Ohm |
| | R4 | 200K Ohm |
| | R5 | 20K Ohm |
| Capacitor | C1 | 0.01 MFD |
| FET | Q1 | 2N5640 Texas Instruments |
| Amplifier | A1 | RCA 324 (¼) |
| Integrator | A2 | RCA 324 (¼) |
| Feedback Resistor | 40 | 7.5M Ohm |

It should be apparent to those skilled in the art that the embodiment described heretofore is considered to be the presently preferred form of the invention. In accordance with the patent statutes, changes may be made in the disclosed device and the manner in which it is used without actually departing from the true spirit and scope of the invention.

What is claimed is:

1. An electrical circuit for supplying high-voltage AC electrical energy to and for regulating resistive current through a complex load having variable resistive and variable shunt capacitive components, the circuit being of the type including: a voltage-controlled inverter having a pair of output terminals, the voltage controlled inverter producing an output voltage waveform at least a portion of each half cycle thereof having a dv/dt approximately equal to zero; means for sensing output current; a reference voltage source; means for comparing a voltage proportional to the sensed current with the reference voltage and for producing an amplified error voltage; means for sampling the amplified error voltage when dv/dt of output voltage is approximately equal to zero; means for obtaining a long-term average of a plurality of samples of the amplified error voltage; and means for applying the long-term average to the inverter to control the amplitude of the high-voltage AC waveform supplied to the complex load; wherein the improvement comprises:
   means for compensating for variations in load current resulting when a changing characteristic of the complex load causes variations in the ratio of peak to average rectified resistive current through the complex load so as to provide a substantially constant average rectified resistive output current.

2. The invention of claim 1 wherein the means for compensating includes means for feeding back to the comparing means a voltage representative of the long-term average of samples of amplified error voltage for effectively modifying the amplitude of the reference voltage thereby to control the level of output voltage and thereby of output current so as to maintain substantially constant average rectified resistive current.

3. An electrical circuit for supplying high-voltage AC electrical energy to and for regulating resistive current through a complex load, comprising:
   a source of DC electrical energy;
   a voltage-controlled inverter having a pair of output terminals, the voltage-controlled inverter for converting DC electrical energy to high-voltage AC electrical energy, the output voltage waveform thereof having a dv/dt approximately equal to zero during at least a portion of each half-cycle;

means for sensing output current;
a reference voltage source;
means for comparing a voltage proportional to the sensed output current with the reference voltage and for producing an amplified error voltage;
means for sampling the amplified error voltage;
means for obtaining a long-term average of a plurality of samples of amplified error voltage;
means for applying the long-term average to the inverter for effecting control of the amplitude of the high-voltage AC waveform and thereby for effecting regulation of output current; and
means for feeding back to the comparing means a voltage representative of the long-term average of samples of amplified error voltage for effectively modifying the amplitude of the reference voltage thereby to control the amplitude of the AC output voltage waveform and thereby to control output current level and thus to maintain substantially constant average rectified resistive current.

4. The invention of claim 3 wherein the means for comparing includes a comparison amplifier having a summing junction for receiving the reference voltage and a voltage proportional to sensed output current and having an output for producing an amplified error voltage.

5. The invention of claim 4 wherein the means for sampling includes a switch operational to pass the amplified error voltage to the obtaining means when dv/dt of the output voltage waveform is approximately equal to zero during the positive half cycle thereof.

6. The invention of claim 5 wherein the means for obtaining a long-term average includes a long-term integrator having an input for receiving from the comparison amplifier the samples of amplified error voltage, and having an output producing a long-term average of such samples of amplified error voltage.

7. The invention of claim 6 wherein the means for feeding back includes a feedback resistor connected between the output of the long-term integrator and the summing junction of the comparison amplifier.

8. The invention of claim 3 wherein the output voltage waveform has linear rise and fall times.

9. An electrical circuit for supplying high-voltage AC electrical energy to and for regulating resistive current through a non-linear complex load, comprising:
a source of DC electrical energy;
a voltage controlled inverter having an output for connection to the load, the inverter serving to convert DC electrical energy to high-voltage AC electrical energy at the output thereof, the output voltage waveform having a dv/dt approximately equal to zero during at least a significant portion of each half-cycle thereof;
a resistor connected in circuit with the inverter output for sensing output current;
a reference voltage source;
a comparison amplifier having a summing junction for comparing a voltage proportional to sensed output current with the reference voltage and for producing at the output an amplified error voltage;
a switch connected in parallel with the comparison amplifier, the switch being operational only when dv/dt of the output voltage waveform is approximately equal to zero and only during the positive half-cycle of the waveform for allowing the comparison amplifier to produce at the output thereof an amplified error voltage;
a long-term integrator having an input for receiving the amplified error voltage from the comparison amplifier and for producing at its output a long-term average of a plurality of the amplified error voltages, the long-term average being applied to the inverter for effecting control of the amplitude of the output voltage waveform thereof; and
a feedback resistor connected between the output of the long-term integrator and the summing junction of the comparison amplifier for effectively modifying the reference voltage thereby to control the value of the amplified error voltage and the long-term average and to effect change in the output voltage to compensate for variations in load current.

* * * * *